US007984863B1

(12) United States Patent
Berberick

(10) Patent No.: US 7,984,863 B1
(45) Date of Patent: Jul. 26, 2011

(54) HIGH-RISE BUILDING FIRE FIGHTING PORTABLE SHAFT SYSTEM

(75) Inventor: Alan Eugene Berberick, Chicago, IL (US)

(73) Assignee: Alan E. Berberick, Chicago, IL (US)

( * ) Notice: Subject to any disclaimer, the term of this patent is extended or adjusted under 35 U.S.C. 154(b) by 459 days.

(21) Appl. No.: 12/317,612

(22) Filed: Dec. 29, 2008

Related U.S. Application Data

(63) Continuation-in-part of application No. 11/540,246, filed on Oct. 2, 2006, now abandoned, which is a continuation-in-part of application No. 11/214,562, filed on Aug. 31, 2005, now abandoned.

(51) Int. Cl.
*A01G 25/09* (2006.01)

(52) U.S. Cl. .............. 239/1; 239/208; 239/281; 169/47; 169/70

(58) Field of Classification Search .................. 239/281, 239/285, 1, 208; 169/70, 47; 248/123.11, 248/125.8, 371, 158, 161, 162.1
See application file for complete search history.

(56) References Cited

U.S. PATENT DOCUMENTS

| | | | | |
|---|---|---|---|---|
| 912,894 | A * | 2/1909 | Ryan | 248/84 |
| 2,251,175 | A * | 7/1941 | Tappe | 169/67 |
| 2,331,373 | A * | 10/1943 | Campbell | 285/119 |
| 2,857,201 | A * | 10/1958 | Palmer | 239/281 |
| 3,104,720 | A * | 9/1963 | Sullivan | 169/25 |
| 3,891,301 | A * | 6/1975 | Heller | 359/384 |
| 3,915,382 | A * | 10/1975 | Davis | 239/195 |
| 4,131,914 | A * | 12/1978 | Bricmont | 348/83 |
| H297 | H * | 7/1987 | Schultz | 141/232 |
| 5,158,614 | A * | 10/1992 | Takeuchi | 118/323 |
| 5,212,655 | A * | 5/1993 | Boehle | 702/155 |
| 5,275,364 | A * | 1/1994 | Burger et al. | 248/125.1 |
| 5,301,756 | A * | 4/1994 | Relyea et al. | 169/24 |
| 5,390,695 | A * | 2/1995 | Howard | 137/355.27 |
| 5,434,614 | A * | 7/1995 | Dainty | 348/64 |
| 5,518,553 | A * | 5/1996 | Moulder | 134/22.18 |
| 5,697,757 | A * | 12/1997 | Lindsay | 414/744.6 |
| 5,786,854 | A * | 7/1998 | Slade et al. | 348/373 |
| 6,039,265 | A * | 3/2000 | Dupre et al. | 239/14.2 |
| 6,164,556 | A * | 12/2000 | Dupre et al. | 239/14.2 |
| 6,478,427 | B1 * | 11/2002 | Morris et al. | 352/243 |
| 6,507,163 | B1 * | 1/2003 | Allen | 318/560 |
| 6,820,575 | B2 * | 11/2004 | Ashton et al. | 122/379 |
| 6,820,842 | B1 * | 11/2004 | Chuang | 248/125.8 |
| 6,820,980 | B1 * | 11/2004 | Romanoff et al. | 352/243 |
| 6,902,294 | B2 * | 6/2005 | Wright | 362/191 |
| 7,028,783 | B2 * | 4/2006 | Celorio-Villasenor | 169/46 |

* cited by examiner

*Primary Examiner* — Christopher S Kim

(57) ABSTRACT

This invention greatly simplifies problem fires above the reach of the longest ladder trucks by using a telescoping, portable shaft extending out of the closest window opening below the fire. Normally, a safe place for firemen. On the outer end of the shaft is a servo-mechanically controlled fire hose nozzle with a miniature television camera, which then both connect along the shaft to the room the shaft extends from. From where firemen can direct water using a console containing a television screen and battery power for the system. Stored in sections aboard its own truck in areas with high buildings, sections which are each, separately, carried up using the stairs by individual firemen, ordinarily the three man crew of a companion ladder fire truck. This invention now allows serious fires in high-rise buildings to be safely and effectively controlled.

14 Claims, 8 Drawing Sheets

HIGH-RISE BUILDING FIRE FIGHTING PORTABLE SHAFT SYSTEM

CROSS-REFERENCE TO RELATED APPLICATIONS

This application is a C.I.P. of Ser. No. 11/540,246 filed Oct. 2, 2006 now abandoned, which was a C.I.P. of the original application Ser. No. 11/214,562 filed on Aug. 31, 2005 now abandoned.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Refer to RELYEA et al, U.S. Pat. No. 5,301,756 on Apr. 12, 1994, which discloses a telescoping boom having a nozzle and camera, but designed for use with fires in airplanes at airports where the invention is kept, mounted permanently on a truck.

However, without any knowledge, whatsoever, of the above patent, I invented a system for fires in tall buildings on Monday, Dec. 6, 2004; as I watched (on television) the uninhibited spreading of a very bad fire in an upper story of the tall office building in Chicago at 135 South LaSalle Street. They were only able to contain it after it had finally spread to near the top of an adjacent lower rooftop where they had placed fire hoses. At that point I realized that firemen might, somehow, be able to inject water directly on similar fires from nearby windows of the burning building itself. However, there has never been a really good way to do that, so let's consider the invention herein described.

BRIEF SUMMARY OF THE INVENTION

Except for a few special cases, serious fires above the tenth story level, the reach of the longest ladder trucks, present fire fighters with no other choice but to combat the blaze in a hands-on way, in what is generally a constricted and unfamiliar environment. This invention, however, presents a real alternative to that. Particularly because an intense fire blows out the windows of the room on fire, coupled with the fact that fire departments will also have a tool to easily take out a window of their choosing, normally just below the fire. This system will then use a telescoping, tubular shaft extending outside the building through that window opening; at the outside tip of the shaft is a nozzle connected to a fire hose, aimed by a servomechanism, all adjacent to a miniature television camera. The hose and wiring to this use the shaft to connect to an operator, inside the room from which the shaft emanates, who has a control console with a television screen. The entire operating system stored in three containers, each weighing less than 60 pounds and kept aboard a special small truck, stationed in areas which have large numbers of buildings of more than ten stories. The three containers are carried up stairs, separately, by three firemen, to a room below and as close to the fire as practical. High-rise buildings are required to guarantee fire departments a certain minimum water pressure on all floors, consequently, this invention will, normally, be able to effectively, apply large volumes of water onto serious fires inside most tall buildings.

DETAILED DESCRIPTION OF THE INVENTION

Figure 1:
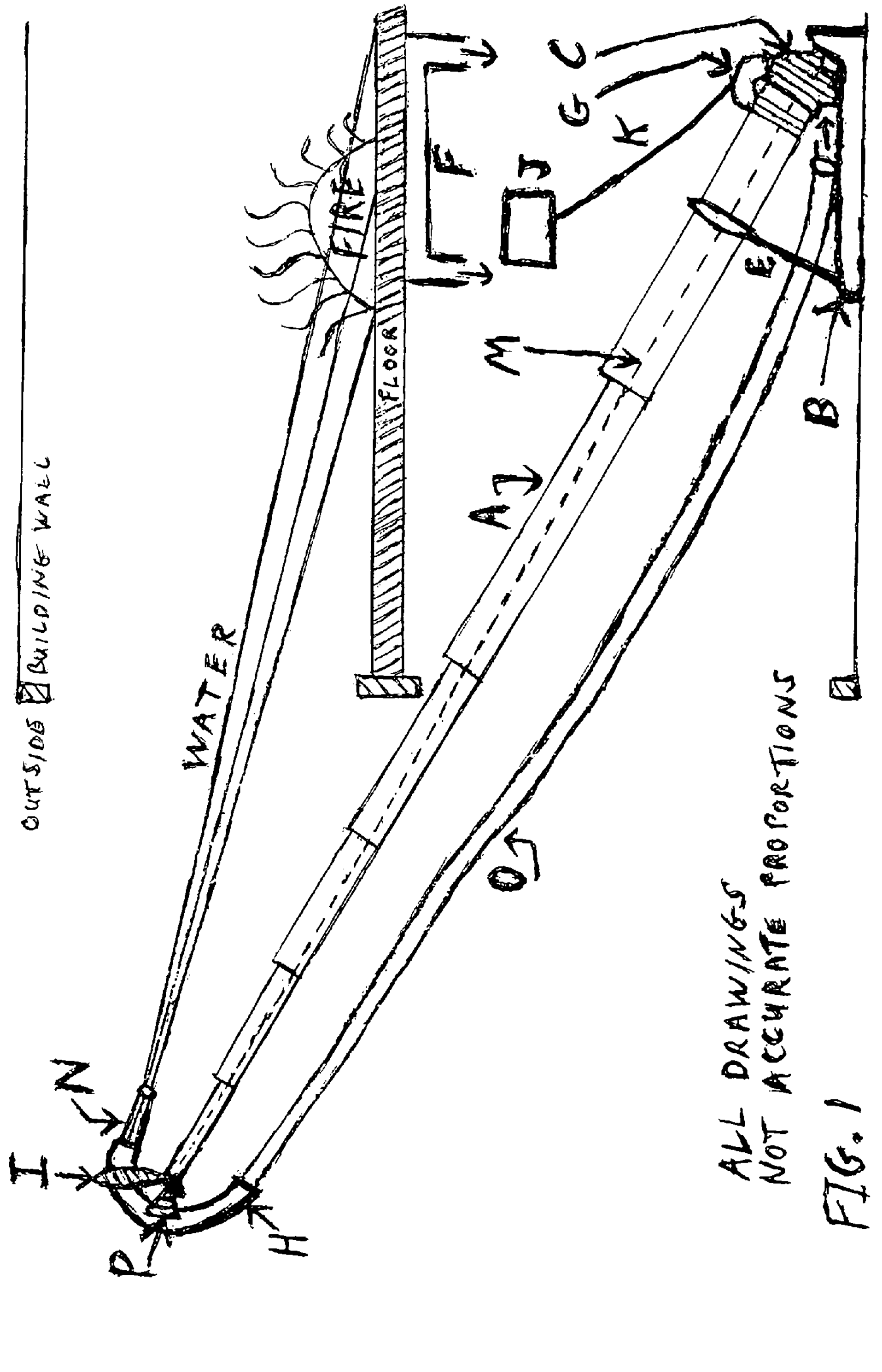
FIG. 1—Side view of entire portable shaft system
FIG. 2—Expandable shaft (A), side views
A—Base section
B—Tip, outside end section
FIG. 3—Base (B)
A—From above
B—End view, facing windows
FIG. 4—Mounting (C), side view
FIG. 5—Triangular channel piece (R)
A—From above
B—Side view
C—End view, facing windows
FIG. 6—Brace and clamp (E), from above
FIG. 7—Motor (G) to extend shaft (A), side view
FIG. 8—Brace (F) to ceiling, side view
FIG. 9—Shaft (A) tip, details
A—Shaft tip overall, including (P), (H), and (I) with (I-R), side view
B—Two motor sub-assembly (I), details including (I-A), (I-B), (I-MH), (I-MV), (I-R), (T) and (I-W), view when looking outside
FIG. 10—Control console (J), view of operator
Figure 2A:
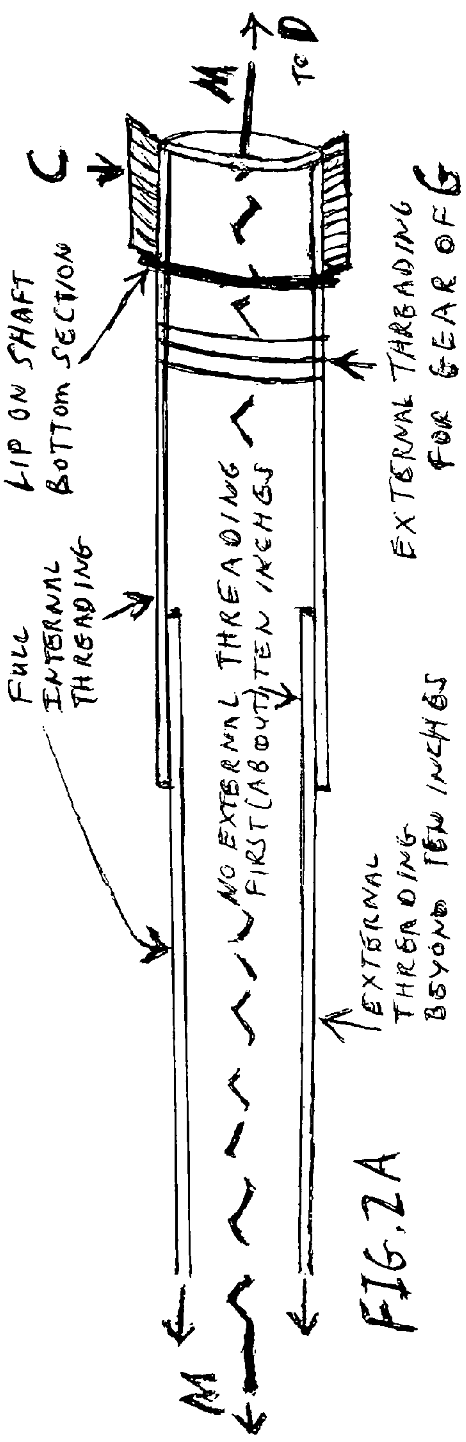
Figure 2B:
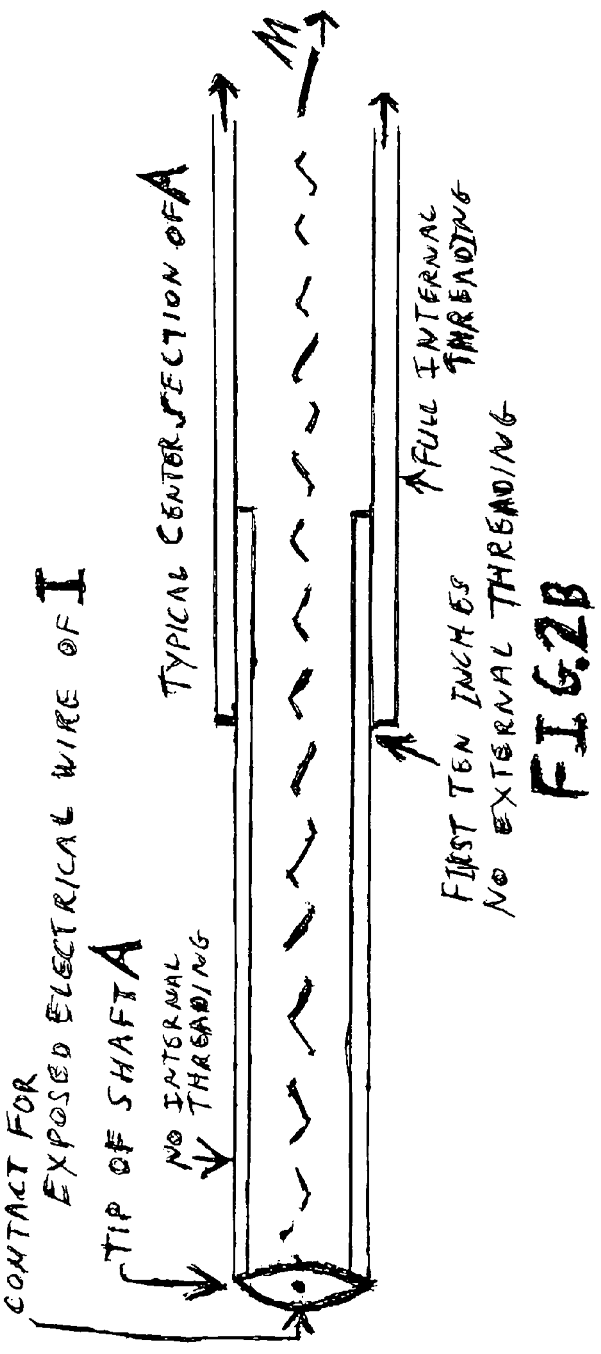
Figure 3A:
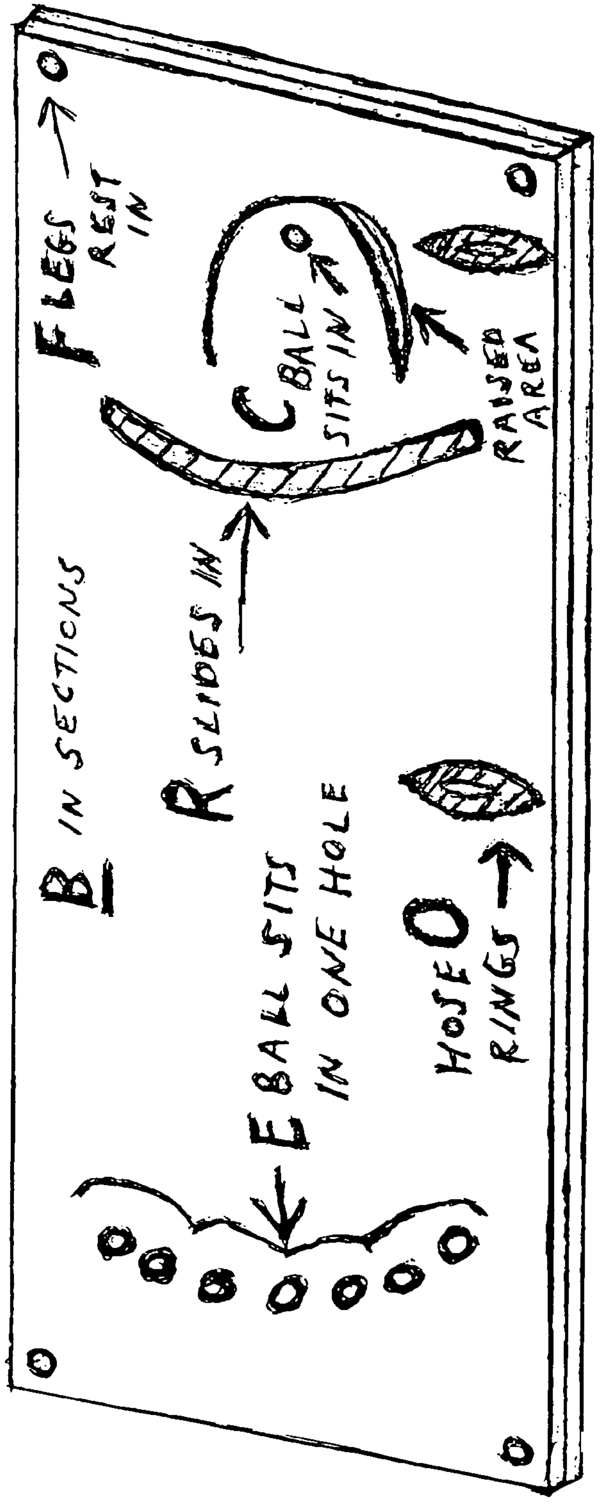
Figure 3B:
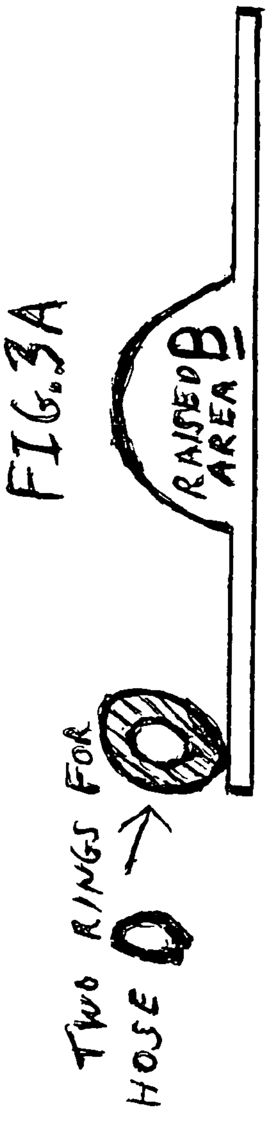
Figure 4:
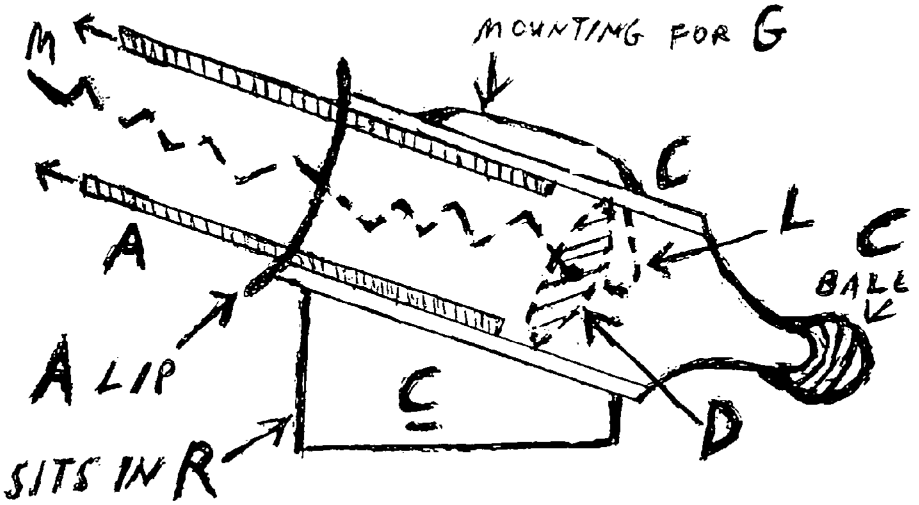
Figure 5A:
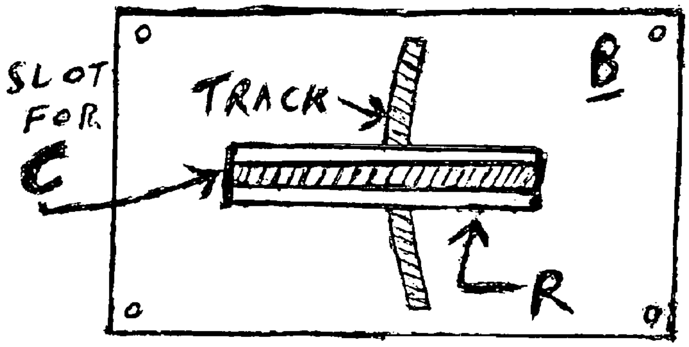
Figure 5B:
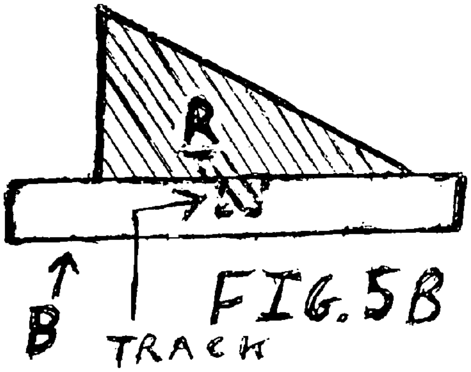
Figure 5C:
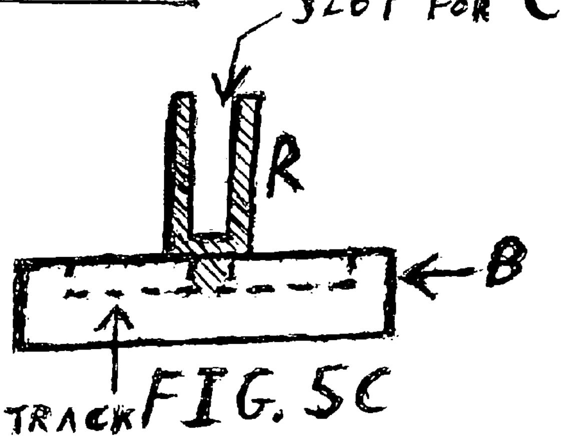
Figure 6:
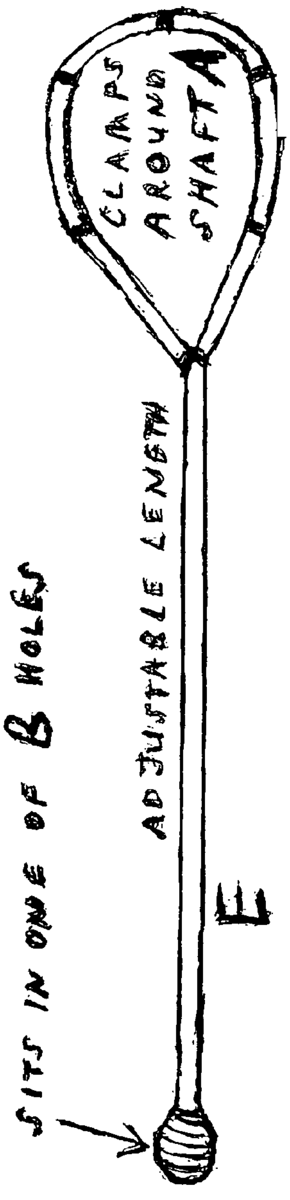
Figure 7:
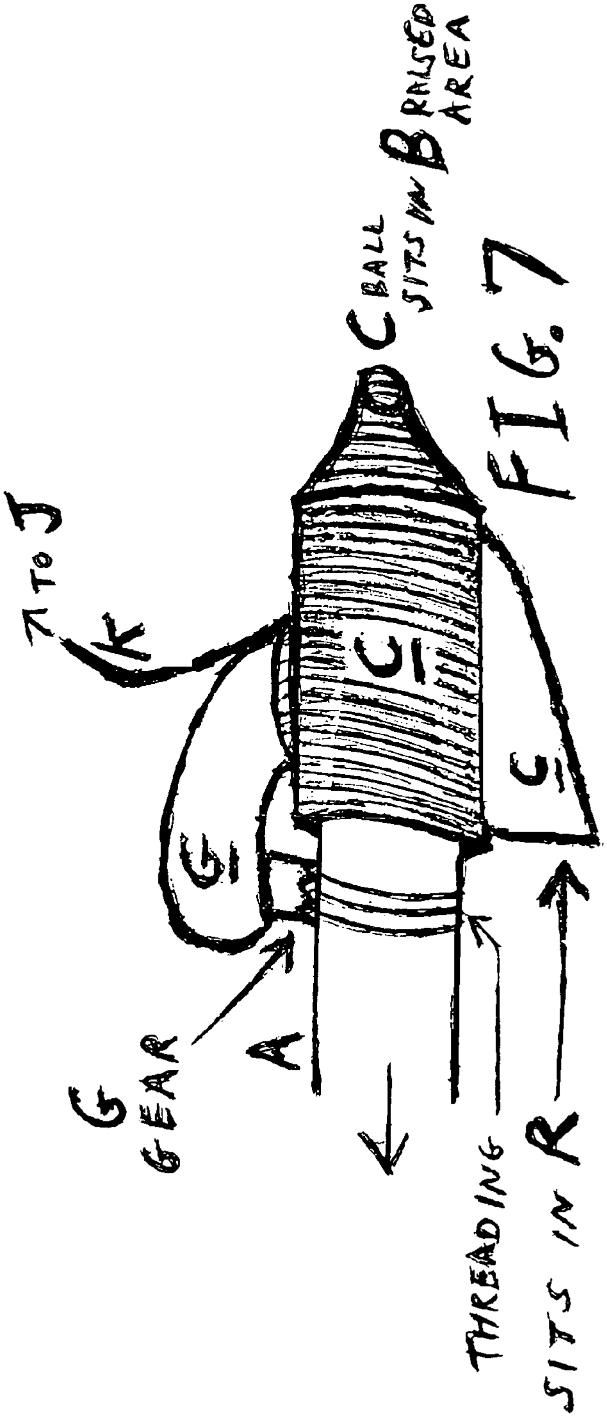
Figure 8:
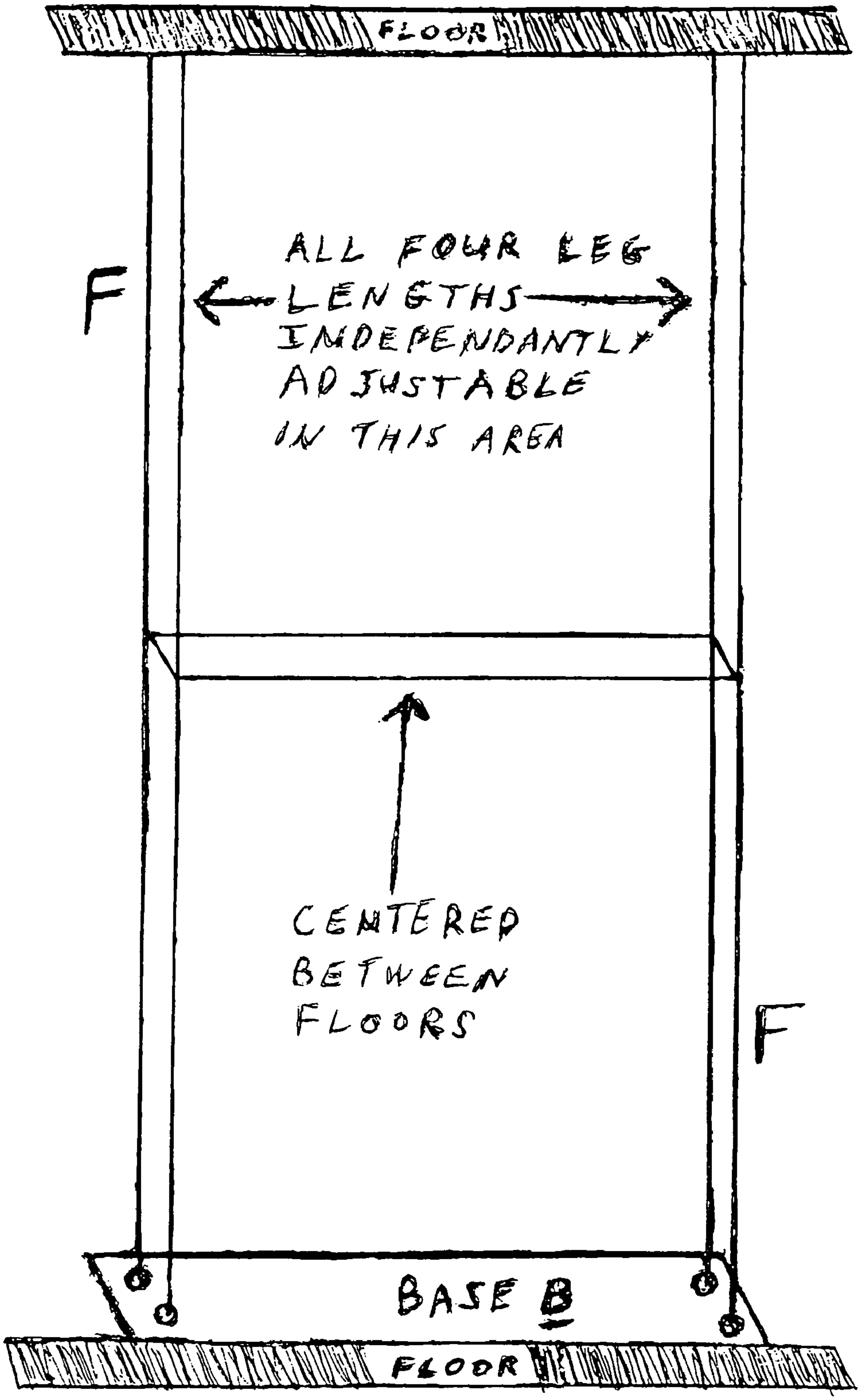
Figure 9A:
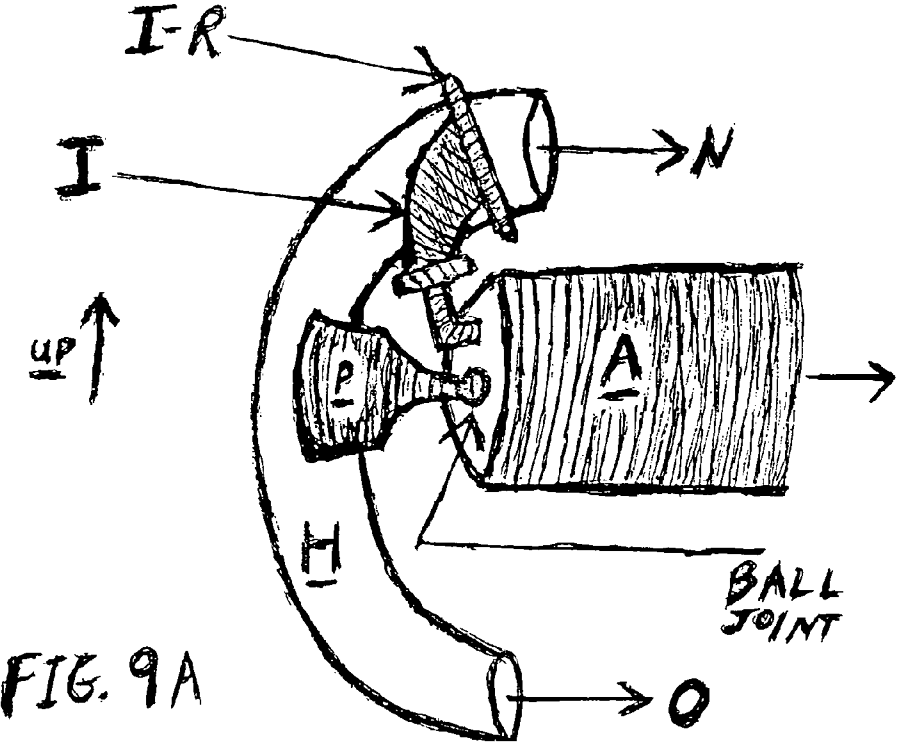
Figure 9B:
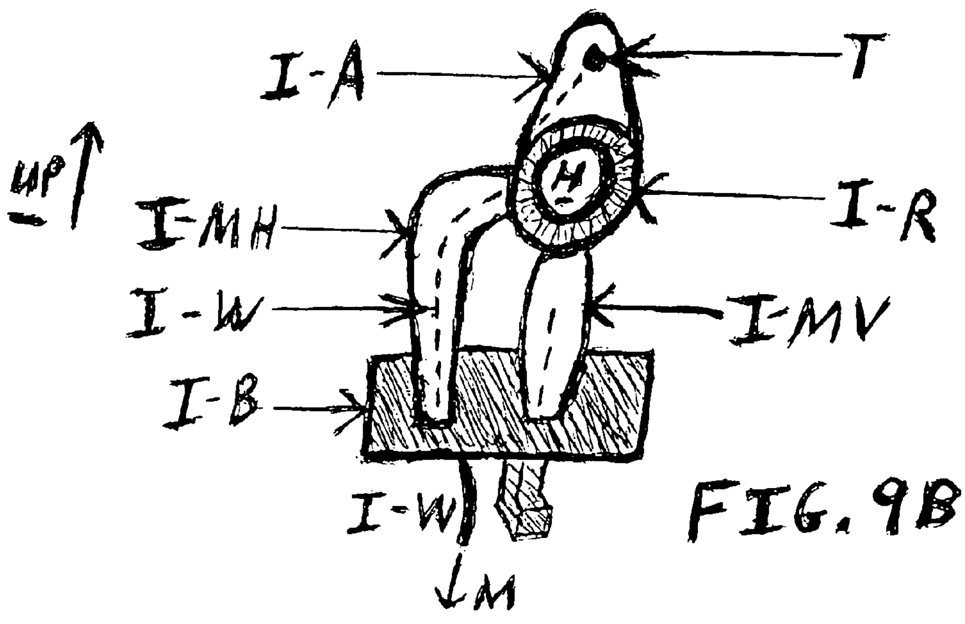
Figure 10:
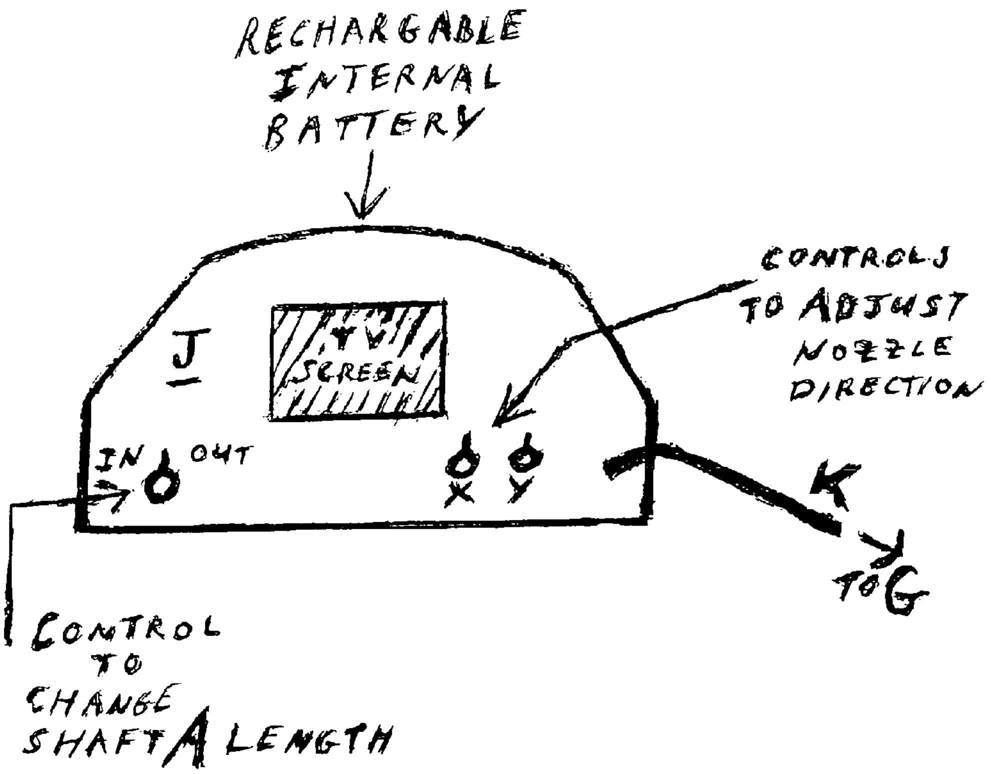

Following this detailed description of the parts of the portable shaft system ("the system") is an analysis of how it operates.

A Expandable shaft ("the shaft") in threaded; hollow, five foot long sections, telescoping in and out from within a base section which has a lip on its outside end so that it overlaps the mounting (C) by a stabilizing distance. All sections probably tubular and extruded.

B Base, transported in sections, as wide as possible given weight considerations, resting on structurally sound ("solid") floor, the base having: a raised area on the part of it which is farthest from the window in which the ball of mounting (C) sits; a semi-circular track around (C) in which a triangular channel piece (R) slides, a channel piece in which a matching triangular flange on (C) remains so as to prevent the rotation of (C); indentations in a semi-circle in the part of the base closest to the window in one of which the ball on (E) sits; two rings attached to the top of the base, each of which are in a vertical plane which is roughly parallel to the outside wall of the building and on the opposite side of the base from console (J), through which a fire hose passes during operation, one ring near the center of the base relative to distance from the window and the other on the end farthest from the window; an indentation in the base near all four corners in which the four legs of brace (F) fit.

C Mounting for shaft (A) to snap into and to rotate within. The mounting having a ball on its stem which sits within the raised area on base (B) farthest from the window, a triangular longitudinal extrusion on its lower side and a place where motor (G) attaches on its upper side.

D Disc of electrically neutral material inside mounting (C) adjacent to shaft (A), with wire (L) and wire (M) connected to it on opposite sides of the same spot.

E Adjustable brace and clamp having a ball at one end which snaps into one of indentations arranged in a semi-circle in base (B), and a clamp at the other end which fastens around shaft (A), such that the clamp slides easily along the shaft, particularly during installation, and such that the shaft is free to rotate within the clamp during actual operation. Overall length of (E) adjustable so as to set required angle between shaft (A) and base (B), it also being necessary for shaft (A) and center section of (E) to remain at a right angle during operation. The indentation in (B) in which the ball of (E) sits is determined by whatever is the required angle between shaft (A) and the building wall.

F Adjustable-height brace, between the four indentations in the base near its four corners and the four opposite points of a solid ceiling above it, consisting of four independently-adjustable legs, whose lengths are specific to fit in a room whose height is substantially the national standard room height, connected together near what is the vertical center of the room.

G Direct current electric motor attached to upper part of mounting (C) having a protruding gear to engage the threading on the outside of the largest and most inside-the-building section of shaft (A), and an internal clutch which disengages the gear when the shaft ceases to rotate easily, such as when all sections become fully extended or retracted. Reversing current direction to the motor reverses direction of motor rotation and causes shaft to retract.

H Semi-circularly curved coupling snapped into fitting (P) on the outer end of the shaft, to change water direction as it moves from hose (O) to nozzle (N), both of which fasten to it.

I Subassembly snapped onto outside tip of shaft (A) consisting of: a base (I-B) on which are mounted two low-torque, electric motors, (I-MH) for horizontal movement and (I-MV) for vertical, a ring (I-R), to which motor (I-MV) is connected at the bottom and to which motor (I-MH) is connected one-quarter of the circumference of the ring away, and through which ring coupling (H) fits so as to aim nozzle (N); the ring having an arm (I-A) extending upwards on which is mounted a miniature television camera (T) to help to accurately aim water flowing from said nozzle; electric wire (I-W) which connects the two motors and camera to shaft wire (M).

J Control console containing a television screen, one control for each of the three motors and rechargeable battery power for the system.

K Electric wire from console (D) to motor (G), and mounting (C).

L Electric wire inside mounting (C) from point where wire (K) connects to inside center of disc (D).

M Coiled electric wire inside shaft (A) permanently attached to the inside of its tip. On the opposite side of this connection, outside shaft, wire (I-W) connects. Just prior to the installation of shaft (A) the free other end of this coiled wire is connected to disc (D) on the side opposite wire (L).

N Special fire hose water nozzle incorporating medium volume with high pressure.

O Common two and one-half inch fire hose, connecting to fire water main of building.

P U-shaped fitting, into which curved coupling (H) snaps, permanently attached to the outside of shaft (A) at the cross-sectional center of its outer end by a ball joint.

R Triangular channel piece sliding in semi-circular track, around shaft mounting (C) on base (B).

T Miniature television camera mounted on shaft-tip subassembly arm (I-A).

** Henceforth, "electrical wiring" refers to the electric wire [(K), (L), (M), and (I-W)], which connect the "electrical devices", which refers to [(D), (G), (I-MH), (I-MV), and (J)], together as specified herein.

This invention allows fires to be safely controlled when they occur above the ten story level, which is the maximum reach of the longest ladder trucks. And from the normally safe room directly below the fire. Stored aboard its own small truck in areas with many high buildings, and packaged in three units, each under 60 pounds in weight and 6×1×1 feet in size. Operated by the three man crew of a companion ladder fire truck, and carried up the stairways, separately, by the same three firemen.

After the system arrives outside a burning building, it is carried via some safe path within the building, normally using only floors and stairs, to the room pre-determined to be both functional and safe for its setup and use. Base (B) assembled just inside a window opening on level and solid flooring, the firemen having a special tool to first remove that window. Brace (F) tightly installed between the base and solid parts of the exposed ceiling, it possibly being necessary to first chop-out parts of an artificial lowered ceiling. Following the connection of wire (M) to disc (D), shaft (A) is snapped into mounting (C), which has a triangular flange, which remains within a matching triangular channel piece (R), sliding in a semi-circular track around (C) on base (B), to prevent rotation of mounting during shaft extension and retraction. Ball on brace and clamp (E) snapped into whichever indentation in the base fixes the desired angle between shaft and outside wall of building, with clamp part then fastened around shaft, followed by length of brace being adjusted to fix the desired angle between shaft and base while also resulting in a right angle between the brace and the shaft. Shaft (A) will probably be in six telescoping sections, extruded, tubular, and of an alloy of aluminum, as is the overall shaft system as much as possible.

Electric motor (G) now installed on upper part of mounting (C) so that its protruding gear engages outside threading on shaft (A). This motor will probably be of the worm-drive gear variety, and operates on direct current. All sections of (A) are threaded on both inside and outside except for outside of outer section, except for near the base where shaft is threaded for the motor altering the shaft length to engage. It is also not necessary for the inside of inner section to be threaded. Examining the shaft while moving away from mounting, external threading on all but the base section begins after the desired overlap distance of adjacent shaft sections, or about ten inches. Said threading will cause all of the inner sections to move outward together as the outer one rotates, until the unthreaded overlap part is reached. Manually-held taut fire hose connected to the tip of the shaft, as well as static friction between the sections, prevents the inner sections from rotating. During operation water pressure in the hose will also accomplish this, so that shaft length can be altered during use. Once each section becomes fully extended it will then also rotate, consequently forcing out the sections inside it. Reversing the direct current to the motor reverses its rotation and the entire process, retracting all sections, the section adjacent to the bottom, driving one, first. Again, even during actual operation.

After wire (I-W) of subassembly (I) is connected to (M), (I) is snapped onto the outside shaft-tip. Coupling (H) now placed through ring (I-R) and then snapped into permanent fitting (P), with hose (O) then threaded through the two rings on base (B) and connected to coupling (H), as is nozzle (N) at the end of the coupling just beyond ring (I-R).

Simultaneously, console (J) is electrically connected to shaft mounting (C) using wire (K), as it also is to motor (C). Its battery supplying all necessary electrical power to the system, and probably rechargeable.

Finally, a fireman, at console (J) in the room where the shaft is situated, extends it. A second fireman then activates the building water, having already connected the hose to the pressurized, fire water supply system of the building as close to the room as possible. The first man is now able to accurately direct a moderately, high-pressure water stream from his console, while the third fireman is free to handle general problems. The water stream is initially used to knock-out whatever fragments of window remain in place, following the very hot, high-pressure air of the room on fire invariably blowing-out its windows. Enabling the system to put up to 400 gallons of water per minute onto serious fires, which may be even somewhat inside buildings, and at any height. Nozzle movement also allows efficient use into rooms which may not be directly above the invention, partly because the shaft does not need to be installed at right angles to the building wall. By virtue of being remotely controlled from below fires, the operation of this system is normally very safe for those using it.

What I claim as my invention is:

1. A fire fighting system comprising:
a building, said building comprising a room:
said room comprising:
a ceiling, said ceiling having an accessible solid portion;
a hose;
a substance entering the system by moving through said hose;
a solid floor; and
a wall, said wall having an opening of at least window-size;
wherein said opening leads to the outside of the building;
wherein the solid ceiling portion and the solid floor are substantially parallel; and wherein the distance between said solid ceiling portion and said floor complies substantially with a national-standard room height;
a path to said room;
a portable shaft system comprising:
an extendable shaft;
said shaft having:
a length; and
an outside-tip,
wherein the shaft extends outside of the building through said opening to position the outside-tip outside of the building;
a base, wherein the base is positioned on the solid floor;
a mounting for the shaft containing a disc, wherein the mounting is positioned on the base;
an adjustable-height brace between the base and said solid ceiling portion;
an adjustable brace and clamp positioned between the base and the shaft;
a first electric motor attached to the mounting, wherein the first electric motor changes the length of the shaft;
a subassembly;
said subassembly comprising:
a second electric motor;
a third electric motor;
a ring;
a television camera;
a semi-circularly curved coupling having two ends; and
a nozzle;
wherein the subassembly is mounted to the outside-tip;
wherein the nozzle is connected to the semi-circularly curved coupling and the hose is connected to the semi-circularly curved coupling;
wherein the subassembly directs the substance moving through the hose out through the nozzle;
a control console;
said control console having:
a television screen;
a first individual control for the first electric motor;
a second individual control for the second electric motor; and
a third individual control for the third electric motor;
wherein the television screen shows an image seen by the television camera;
a source of electrical power for the system; and
an electrical wiring connecting the three electric motors, said disc, said television camera, and said control console.

2. The fire fighting system of claim 1 wherein
said base further comprises a series of indentations;
said adjustable brace and clamp further comprises:
a main section having:
an adjustable length;
a first end; and
a second end
a clamp positioned at the first end of the main section, wherein the clamp fastens around the shaft;
a ball positioned at the second end, wherein the ball sits in one of the indentations;
said indentations being closer to the opening in the wall than the mounting; and
said adjustable brace and clamp fixes an angle between the base and the shaft and an angle between the shaft and the wall of the building.

3. The fire fighting system of claim 1 wherein the portable shaft system further comprises
said base having an indentation and a track;
said mounting comprises:
a ball, wherein the ball sits in the indentation;
a triangularly-shaped flange;
a matching triangularly-shaped channel piece;
an area into which the shaft snaps, wherein said disc is adjacent to said shaft; and into
a place where the first electric motor attaches;
wherein the triangularly-shaped flange remains in the matching triangularly-shaped channel piece;
wherein the matching triangularly-shaped channel piece slides in the track in the base; and
wherein the triangularly-shaped flange and the matching triangularly-shaped channel piece prevent rotation of the mounting.

4. The fire fighting system of claim 1 wherein
said second electric motor and the said third electric motor being connected to said ring to aim said nozzle;
said television camera mounted on said ring;
said semi-circularly curved coupling mounted to the outside tip of the shaft and passing through said ring; and
said nozzle connected to the semi-circularly curved coupling proximate to said ring; wherein said hose is connected to the opposite end of the coupling.

5. The fire fighting system of claim 1 wherein the portable shaft system further comprises said source of electrical power being a battery.

6. The fire fighting system of claim 5 wherein the portable shaft system further comprises said battery being a rechargeable battery.

7. The fire fighting system of claim 5 wherein the portable shaft system further comprises said battery being in said control console.

8. The fire fighting system of claim 6 wherein the portable shaft system further comprises said rechargeable battery being in said control console.

9. The fire fighting system of claim 1 wherein the portable shaft system further comprises
- said first electric motor being powered by said source of electrical power;
- said shaft further comprising cylindrical, hollow, overlapping sections;
- each of said sections having overlapping threads compatible with those of adjacent sections;
- said first electric motor rotating one of said sections adjacent said mounting to extend said shaft.

10. The fire fighting system of claim 9 wherein the portable shaft system further comprises said shaft being retracted by reversing a rotational direction of the first electric motor.

11. The fire fighting system of claim 10 wherein the portable shaft system further comprises said source of power supplying direct current and wherein reversal of the direct current reverses the rotational direction of the first electric motor.

12. The fire fighting system of claim 1 wherein
- said base further comprises four indentations;
- said adjustable-height brace comprising four legs and a brace;
- each of said four legs resting in a respective indentation of said four indentations;
- said four legs extending between the indentions and said accessible solid ceiling portion;
- each of said four legs being separately adjustable; and
- said brace of the adjustable-height brace being positioned between the four legs.

13. The fire fighting system of claim 1 further comprising a plurality of rings;
- the plurality of rings attached to a top of said base; and
- said hose passing through the plurality of rings attached to the top of said base.

14. A process for controlling a fire in a building using a fire fighting system comprising the steps of:

a) providing a building, said building comprising a room safe for a team of operators:
  - said room comprising:
    - a ceiling, said ceiling having an accessible solid portion;
    - a hose;
    - a substance entering the system by moving through said hose;
    - a solid floor; and
    - a wall, said wall having an opening of at least window size;
  - wherein said opening leads to the outside of the building;
  - wherein the solid ceiling portion and the solid floor are substantially parallel; and wherein the distance between said solid ceiling portion and said floor complies substantially with a national standard room height;
  - a path to said room safe for the team of operators;

b) assembling said system prior to the path to said room, along said path to said room, and in said room;

c) providing a portable shaft system comprising:
  - an extendable shaft;
    - said shaft having:
      - a length; and
      - an outside tip,
    - wherein the shaft extends outside of the building through said opening to position the outside tip outside of the building;
  - a base, wherein the base is positioned on the solid floor;
  - a mounting for the shaft containing a disc, wherein the mounting is positioned on the base;
  - an adjustable-height brace between the base and said solid ceiling portion;
  - an adjustable brace and clamp positioned between the base and the shaft;
  - a first electric motor attached to the mounting, wherein the first electric motor changes the length of the shaft;
  - a subassembly;
    - said subassembly comprising:
      - a second electric motor;
      - a third electric motor;
      - a ring;
      - a television camera;
      - a semi-circularly curved coupling having two ends; and
      - a nozzle;
    - wherein the subassembly is mounted to the outside tip;
    - wherein the nozzle is connected to the semi-circularly curved coupling and the hose is connected to the semi-circularly curved coupling;
    - wherein the subassembly directs the substance moving through the hose out through the nozzle;
  - a control console;
    - said control console having:
      - a television screen;
      - a first individual control for the first electric motor;
      - a second individual control for the second electric motor; and
      - a third individual control for the third electric motor;
    - wherein the television screen shows an image seen by the television camera;
  - a source of electrical power for the system; and
  - an electrical wiring connecting the three electric motors, said disc, said television camera, and said control console;

d) introducing said portable shaft system to the outside of said building through said opening in said wall;

e) using said portable shaft system to direct the substance moving through the hose to control said fire.

* * * * *

UNITED STATES PATENT AND TRADEMARK OFFICE

CERTIFICATE OF CORRECTION

PATENT NO. : 7,984,863 B1
APPLICATION NO. : 12/317612
DATED : July 26, 2011
INVENTOR(S) : Alan E. Berberick It is certified that error appears in the above-identified patent and that said Letters Patent is hereby corrected as shown below:

Claims for Patent # 7,984,863 should read:

Claim 1. A fire fighting system comprising:
a building comprising:
a room comprising:
a ceiling, said ceiling having an accessible solid portion;
a hose;
a substance, said substance moving through said hose;
a solid floor; and
a wall, said wall having an opening of at least window-size;
wherein said opening leads to the outside of the building;
wherein the solid ceiling portion and the solid floor are substantially parallel; and
wherein the distance between said solid ceiling portion and said floor complies substantially with a national-standard room height; and
said building also having a path to said room; and
a portable shaft system comprising:
an extendable shaft, said shaft having:
a length; and
an outside-tip;
wherein the shaft expends outside of the building through said opening, to position the outside-tip outside of the building;
a base, wherein the base is positioned on the solid floor;
a mounting for the shaft containing a disc, wherein the mounting is positioned on the base;
an adjustable-height brace between the base and said solid ceiling portion;

Signed and Sealed this
Eighth Day of November, 2011

David J. Kappos

David J. Kappos
*Director of the United States Patent and Trademark Office* an adjustable brace and clamp positioned between the base and the shaft;

a first electric motor attached to the mounting, wherein the first electric motor changes the length of the shaft;

a subassembly comprising:

a second electric motor;

a third electric motor;

a ring;

a television camera;

a semi-circularly curved coupling having two ends; and a nozzle;

wherein the subassembly is mounted to the outside-tip;

wherein the nozzle is connected to the semi-circularly curved coupling, and the hose is connected to the opposite end of the semi-circularly curved coupling; and wherein the subassembly directs the substance, as it leaves the portable shaft system through the nozzle;

a control console comprising:

a television screen, wherein the television screen shows an image seen by the television camera;

a first individual control for the first electric motor;

a second individual control for the second electric motor; and a third individual control for the third electric motor;

a source of electrical power for the portable shaft system; and an electrical wiring connecting the three electric motors, said disc, said television camera, and said control console.

Claim 2. The fire fighting system of claim 1 wherein said base further comprises a series of indentations; and said adjustable brace and clamp further comprises:

a main section having:

an adjustable length;

a first end; and a second end;

a clamp positioned at the first end of the main section, wherein the clamp fastens around the shaft; and a ball positioned at the second end, wherein the ball sits in one of the indentations;

wherein said indentations are closer to the opening in the wall than is the mounting; and wherein said adjustable brace and clamp fixes an angle between the base and the shaft, and an angle between the shaft and the wall of the building.

Claim 3. The fire fighting system of claim 1 wherein the portable shaft system further comprises:
said base having an indentation and a track; and
said mounting comprising:
a ball, wherein the ball sits in the indentation;
a triangularly-shaped flange;
a matching triangularly-shaped channel piece;
an area into which the shaft snaps, wherein said disc is adjacent to said shaft; and
a place where the first electric motor attaches;
wherein the triangularly-shaped flange remains in the matching triangularly-shaped channel piece;
wherein the matching triangularly-shaped channel piece slides in the track in the base; and
wherein the triangularly-shaped flange and the matching triangularly-shaped channel piece prevent rotation of the mounting.

Claim 4. The fire fighting system of claim 1 wherein
said second electric motor and said third electric motor are connected to said ring to aim said nozzle;
said television camera is mounted on said ring;
said semi-circularly curved coupling is mounted to the outside-tip of the shaft and passes through said ring; and
said nozzle is connected to the semi-circularly curved coupling proximate to said ring;
wherein said hose is connected to the opposite end of the coupling.

Claim 5. The fire fighting system of claim 1 wherein the portable shaft system further comprises said source of electrical power being a battery.

Claim 6. The fire fighting system of claim 5 wherein the portable shaft system further comprises said battery being a rechargeable battery.

Claim 7. The fire fighting system of claim 5 wherein the portable shaft system further comprises said battery being in said control console.

Claim 8. The fire fighting system of claim 6 wherein the portable shaft system further comprises said rechargeable battery being in said control console.

Claim 9. The fire fighting system of claim 1 wherein the portable shaft system further comprises:
said first electric motor being powered by said source of electrical power;
said shaft further comprising cylindrical, hollow, overlapping sections; and
each of said sections having overlapping threads compatible with those of adjacent sections;
wherein said first electric motor rotates one of said sections adjacent to said mounting, to extend said shaft.

Claim 10. The fire fighting system of claim 9 wherein the portable shaft system further comprises said shaft being retracted by reversing a rotational direction of the first electric motor.

Claim 11. The fire fighting system of claim 10 wherein the portable shaft system further comprises said source of power supplying direct current, wherein reversal of the direct current reverses the rotational direction of the first electric motor.

Claim 12. The fire fighting system of claim 1 wherein
said base further comprises four indentations; and
said adjustable-height brace comprises four legs and a brace;
wherein each of said four legs rests in a respective indentation of said four indentations;
wherein said four legs extend between the indentations and said accessible solid ceiling portion;
wherein each of said four legs is separately adjustable; and
wherein said brace of the adjustable-height brace is positioned between the four-legs.

Claim 13. The fire fighting system of claim 1 further comprises a plurality of rings;
wherein the plurality of rings is attached to a top of said base; and
wherein said hose passes through the plurality of rings attached to the top of said base.

Claim 14. A process for controlling a fire in a building using a fire fighting system which includes a portable shaft system comprising the steps of:
a) providing a building comprising:
a room safe for a team of operators, said room comprising:
a ceiling, said ceiling having an accessible solid portion;
a hose;
a substance, said substance moving through said hose;
a solid floor; and
a wall, said wall having an opening of at least window-size;
wherein said opening leads to the outside of the building;
wherein the solid ceiling portion and the solid floor are substantially parallel; and
wherein the distance between said solid ceiling portion and said floor complies substantially with a national-standard room height; and
said building also comprising a path to said room, wherein said path is safe for the team of operators;
b) providing a portable shaft system, and assembling said portable shaft system prior to the path to said room, along the path to said room, and in said room said portable shaft system comprising:

an extendable shaft, said shaft having:

a length; and an outside-tip;

wherein the shaft extends outside of the building through said opening, to position the outside-tip outside of the building;

a base, wherein the base is positioned on the solid floor;

a mounting for the shaft containing a disc, wherein the mounting is positioned on the base;

an adjustable-height brace between the base and said solid ceiling portion;

an adjustable brace and clamp positioned between the base and the shaft;

a first electric motor attached to the mounting, wherein the first electric motor changes the length of the shaft;

a subassembly comprising:

a second electric motor;

a third electric motor;

a ring;

a television camera;

a semi-circularly curved coupling having two ends; and a nozzle;

wherein the subassembly is mounted to the outside-tip;

wherein the nozzle is connected to the semi-circularly curved coupling, and the hose is connected to the opposite end of the semi-circularly curved coupling; and wherein the subassembly directs the substance, as it leaves the portable shaft system through the nozzle;

a control console comprising:

a television screen, wherein the television screen shows an image seen by the television camera;

a first individual control for the first electric motor;

a second individual control for the second electric motor; and a third individual control for the third electric motor;

a source of electrical power for the portable shaft system; and an electrical wiring connecting the three electric motors, said disc, said television camera, and said control console;

c) introducing said portable shaft system to the outside of said building through said opening in said wall;

d) using said portable shaft system to direct the substance moving through the hose to control said fire.

UNITED STATES PATENT AND TRADEMARK OFFICE

CERTIFICATE OF CORRECTION

PATENT NO. : 7,984,863 B1
APPLICATION NO. : 12/317612
DATED : July 26, 2011
INVENTOR(S) : Alan E. Berberick It is certified that error appears in the above-identified patent and that said Letters Patent is hereby corrected as shown below:

Column 4, line 65, should read -- shaft mounting (C) using wire (K), as it also is to motor (G). --

Column 5, line 22 - Column 8, line 56, delete claims 1-14 and replace with following claims 1-14:

Claim 1. A fire fighting system comprising:
a building comprising:
a room comprising:
a ceiling, said ceiling having an accessible solid portion;
a hose;
a substance, said substance moving through said hose;
a solid floor; and
a wall, said wall having an opening of at least window-size;
wherein said opening leads to the outside of the building;
wherein the solid ceiling portion and the solid floor are substantially parallel; and
wherein the distance between said solid ceiling portion and said floor complies substantially with a national-standard room height; and
said building also having a path to said room; and
a portable shaft system comprising:
an extendable shaft, said shaft having:
a length; and
an outside-tip;
wherein the shaft expends outside of the building through said opening, to position the outside-tip outside of the building;

This certificate supersedes the Certificate of Correction issued November 8, 2011.

Signed and Sealed this
Twenty-ninth Day of November, 2011

David J. Kappos

David J. Kappos
*Director of the United States Patent and Trademark Office* a base, wherein the base is positioned on the solid floor;

a mounting for the shaft containing a disc, wherein the mounting is positioned on the base;

an adjustable-height brace between the base and said solid ceiling portion;

an adjustable brace and clamp positioned between the base and the shaft;

a first electric motor attached to the mounting, wherein the first electric motor changes the length of the shaft;

a subassembly comprising:

a second electric motor;

a third electric motor;

a ring;

a television camera;

a semi-circularly curved coupling having two ends; and a nozzle;

wherein the subassembly is mounted to the outside-tip;

wherein the nozzle is connected to the semi-circularly curved coupling, and the hose is connected to the opposite end of the semi-circularly curved coupling; and wherein the subassembly directs the substance, as it leaves the portable shaft system through the nozzle;

a control console comprising:

a television screen, wherein the television screen shows an image seen by the television camera;

a first individual control for the first electric motor;

a second individual control for the second electric motor; and a third individual control for the third electric motor;

a source of electrical power for the portable shaft system; and an electrical wiring connecting the three electric motors, said disc, said television camera, and said control console.

Claim 2. The fire fighting system of claim 1 wherein said base further comprises a series of indentations; and said adjustable brace and clamp further comprises:

a main section having:

an adjustable length;

a first end; and a second end;

a clamp positioned at the first end of the main section, wherein the clamp fastens around the shaft; and a ball positioned at the second end, wherein the ball sits in one of the indentations;

wherein said indentations are closer to the opening in the wall than is the mounting; and wherein said adjustable brace and clamp fixes an angle between the base and the shaft, and an angle between the shaft and the wall of the building.

Claim 3. The fire fighting system of claim 1 wherein the portable shaft system further comprises:

said base having an indentation and a track; and said mounting comprising:

a ball, wherein the ball sits in the indentation;

a triangularly-shaped flange;

a matching triangularly-shaped channel piece;

an area into which the shaft snaps, wherein said disc is adjacent to said shaft; and a place where the first electric motor attaches;

wherein the triangularly-shaped flange remains in the matching triangularly-shaped channel piece;

wherein the matching triangularly-shaped channel piece slides in the track in the base; and wherein the triangularly-shaped flange and the matching triangularly-shaped channel piece prevent rotation of the mounting.

Claim 4. The fire fighting system of claim 1 wherein said second electric motor and said third electric motor are connected to said ring to aim said nozzle;

said television camera is mounted on said ring;

said semi-circularly curved coupling is mounted to the outside-tip of the shaft and passes through said ring; and said nozzle is connected to the semi-circularly curved coupling proximate to said ring;

wherein said hose is connected to the opposite end of the coupling.

Claim 5. The fire fighting system of claim 1 wherein the portable shaft system further comprises said source of electrical power being a battery.

Claim 6. The fire fighting system of claim 5 wherein the portable shaft system further comprises said battery being a rechargeable battery.

Claim 7. The fire fighting system of claim 5 wherein the portable shaft system further comprises said battery being in said control console.

Claim 8. The fire fighting system of claim 6 wherein the portable shaft system further comprises said rechargeable battery being in said control console.

Claim 9. The fire fighting system of claim 1 wherein the portable shaft system further comprises:

said first electric motor being powered by said source of electrical power;

said shaft further comprising cylindrical, hollow, overlapping sections; and each of said sections having overlapping threads compatible with those of adjacent sections;

wherein said first electric motor rotates one of said sections adjacent to said mounting, to extend said shaft.

Claim 10. The fire fighting system of claim 9 wherein the portable shaft system further comprises said shaft being retracted by reversing a rotational direction of the first electric motor.

Claim 11. The fire fighting system of claim 10 wherein the portable shaft system further comprises said source of power supplying direct current, wherein reversal of the direct current reverses the rotational direction of the first electric motor.

Claim 12. The fire fighting system of claim 1 wherein
said base further comprises four indentations; and
said adjustable-height brace comprises four legs and a brace;
wherein each of said four legs rests in a respective indentation of said four indentations;
wherein said four legs extend between the indentations and said accessible solid ceiling portion;
wherein each of said four legs is separately adjustable; and
wherein said brace of the adjustable-height brace is positioned between the four legs.

Claim 13. The fire fighting system of claim 1 further comprises a plurality of rings;
wherein the plurality of rings is attached to a top of said base; and
wherein said hose passes through the plurality of rings attached to the top of said base.

Claim 14. A process for controlling a fire in a building using a fire fighting system which includes a portable shaft system comprising the steps of:
a) providing a building comprising:
a room safe for a team of operators, said room comprising:
a ceiling, said ceiling having an accessible solid portion;
a hose;
a substance, said substance moving through said hose;
a solid floor; and
a wall, said wall having an opening of at least window-size;
wherein said opening leads to the outside of the building;
wherein the solid ceiling portion and the solid floor are substantially parallel; and
wherein the distance between said solid ceiling portion and said floor complies substantially with a national-standard room height; and
said building also comprising a path to said room, wherein said path is safe for the team of operators;
b) providing a portable shaft system, and assembling said portable shaft system prior to the path to said room, along the path to said room, and in said room, said portable shaft system comprising:
an extendable shaft, said shaft having:
a length; and an outside-tip;

wherein the shaft extends outside of the building through said opening, to position the outside-tip outside of the building;

a base, wherein the base is positioned on the solid floor;

a mounting for the shaft containing a disc, wherein the mounting is positioned on the base;

an adjustable-height brace between the base and said solid ceiling portion;

an adjustable brace and clamp positioned between the base and the shaft;

a first electric motor attached to the mounting, wherein the first electric motor changes the length of the shaft;

a subassembly comprising:

a second electric motor;

a third electric motor;

a ring;

a television camera;

a semi-circularly curved coupling having two ends; and a nozzle;

wherein the subassembly is mounted to the outside-tip;

wherein the nozzle is connected to the semi-circularly curved coupling, and the hose is connected to the opposite end of the semi-circularly curved coupling; and wherein the subassembly directs the substance, as it leaves the portable shaft system through the nozzle;

a control console comprising:

a television screen, wherein the television screen shows an image seen by the television camera;

a first individual control for the first electric motor;

a second individual control for the second electric motor; and a third individual control for the third electric motor;

a source of electrical power for the portable shaft system; and an electrical wiring connecting the three electric motors, said disc, said television camera, and said control console;

c) introducing said portable shaft system to the outside of said building through said opening in said wall;

d) using said portable shaft system to direct the substance moving through the hose to control said fire.

UNITED STATES PATENT AND TRADEMARK OFFICE

CERTIFICATE OF CORRECTION

PATENT NO. : 7,984,863 B1
APPLICATION NO. : 12/317612
DATED : July 26, 2011
INVENTOR(S) : Alan E. Berberick It is certified that error appears in the above-identified patent and that said Letters Patent is hereby corrected as shown below:

Column 4, line 65, should read -- shaft mounting (C) using wire (K), as it also is to motor (G). --

Column 5, line 22 - Column 8, line 56, delete claims 1-14 and replace with following claims 1-14:

Claim 1. A fire fighting system comprising:
a building comprising:
a room comprising:
a ceiling, said ceiling having an accessible solid portion;
a hose;
a substance, said substance moving through said hose;
a solid floor; and
a wall, said wall having an opening of at least window-size;
wherein said opening leads to the outside of the building;
wherein the solid ceiling portion and the solid floor are substantially parallel; and
wherein the distance between said solid ceiling portion and said floor complies substantially with a national-standard room height; and
said building also comprising a path to said room; and
a portable shaft system comprising:
an extendable shaft, said shaft having:
a length; and
an outside-tip;
wherein the shaft extends outside of the building through said opening, to position the outside-tip outside of the building;

This certificate supersedes the Certificates of Correction issued November 8, 2011 and November 29, 2011.

Signed and Sealed this
Tenth Day of January, 2012

David J. Kappos

David J. Kappos
*Director of the United States Patent and Trademark Office* a base, wherein the base is positioned on the solid floor;

a mounting for the shaft containing a disc, wherein the mounting is positioned on the base;

an adjustable-height brace between the base and said solid ceiling portion;

an adjustable brace and clamp positioned between the base and the shaft;

a first electric motor attached to the mounting, wherein the first electric motor changes the length of the shaft;

a subassembly comprising:

a second electric motor;

a third electric motor;

a ring;

a television camera;

a semi-circularly curved coupling having two ends; and a nozzle;

wherein the subassembly is mounted to the outside-tip;

wherein the nozzle is connected to the semi-circularly curved coupling, and the hose is connected to the opposite end of the semi-circularly curved coupling; and wherein the subassembly directs the substance, as it leaves the portable shaft system through the nozzle;

a control console comprising:

a television screen, wherein the television screen shows an image seen by the television camera;

a first individual control for the first electric motor;

a second individual control for the second electric motor; and a third individual control for the third electric motor;

a source of electrical power for the portable shaft system; and an electrical wiring connecting the three electric motors, said disc, said television camera, and said control console.

Claim 2. The fire fighting system of claim 1 wherein said base further comprises a series of indentations; and said adjustable brace and clamp further comprises:

a main section having:

an adjustable length;

a first end; and a second end;

a clamp positioned at the first end of the main section, wherein the clamp fastens around the shaft; and a ball positioned at the second end, wherein the ball sits in one of the indentations; wherein said indentations are closer to the opening in the wall than is the mounting; and wherein said adjustable brace and clamp fixes an angle between the base and the shaft, and an angle between the shaft and the wall of the building.

Claim 3. The fire fighting system of claim 1 wherein the portable shaft system further comprises:

said base having an indentation and a track; and said mounting comprising:

a ball, wherein the ball sits in the indentation;

a triangularly-shaped flange;

a matching triangularly-shaped channel piece;

an area into which the shaft snaps, wherein said disc is adjacent to said shaft; and a place where the first electric motor attaches;

wherein the triangularly-shaped flange remains in the matching triangularly-shaped channel piece;

wherein the matching triangularly-shaped channel piece slides in the track in the base; and wherein the triangularly-shaped flange and the matching triangularly-shaped channel piece prevent rotation of the mounting.

Claim 4. The fire fighting system of claim 1 wherein said second electric motor and said third electric motor are connected to said ring to aim said nozzle;

said television camera is mounted on said ring;

said semi-circularly curved coupling is mounted to the outside-tip of the shaft and passes through said ring; and said nozzle is connected to the semi-circularly curved coupling proximate to said ring;

wherein said hose is connected to the opposite end of the coupling.

Claim 5. The fire fighting system of claim 1 wherein the portable shaft system further comprises said source of electrical power being a battery.

Claim 6. The fire fighting system of claim 5 wherein the portable shaft system further comprises said battery being a rechargeable battery.

Claim 7. The fire fighting system of claim 5 wherein the portable shaft system further comprises said battery being in said control console.

Claim 8. The fire fighting system of claim 6 wherein the portable shaft system further comprises said rechargeable battery being in said control console.

Claim 9. The fire fighting system of claim 1 wherein the portable shaft system further comprises:

said first electric motor being powered by said source of electrical power;

said shaft further comprising cylindrical, hollow, overlapping sections; and each of said sections having overlapping threads compatible with those of adjacent sections;

wherein said first electric motor rotates one of said sections adjacent to said mounting, to extend said shaft.

Claim 10. The fire fighting system of claim 9 wherein the portable shaft system further comprises said shaft being retracted by reversing a rotational direction of the first electric motor.

Claim 11. The fire fighting system of claim 10 wherein the portable shaft system further comprises said source of power supplying direct current, wherein reversal of the direct current reverses the rotational direction of the first electric motor.

Claim 12. The fire fighting system of claim 1 wherein
said base further comprises four indentations; and
said adjustable-height brace comprises four legs and a brace;
wherein each of said four legs rests in a respective indentation of said four indentations;
wherein said four legs extend between the indentations and said accessible solid ceiling portion;
wherein each of said four legs is separately adjustable; and
wherein said brace of the adjustable-height brace is positioned between the four legs.

Claim 13. The fire fighting system of claim 1 further comprises a plurality of rings;
wherein the plurality of rings is attached to a top of said base; and
wherein said hose passes through the plurality of rings attached to the top of said base.

Claim 14. A process for controlling a fire in a building using a fire fighting system which includes a portable shaft system comprising the steps of:
a) providing a building comprising:
a room safe for a team of operators, said room comprising:
a ceiling, said ceiling having an accessible solid portion;
a hose;
a substance, said substance moving through said hose;
a solid floor; and
a wall, said wall having an opening of at least window-size;
wherein said opening leads to the outside of the building;
wherein the solid ceiling portion and the solid floor are substantially parallel; and
wherein the distance between said solid ceiling portion and said floor complies substantially with a national-standard room height; and
said building also comprising a path to said room, wherein said path is safe for the team of operators;
b) providing a portable shaft system, and assembling said portable shaft system prior to the path to said room, along the path to said room, and in said room, said portable shaft system comprising:
an extendable shaft, said shaft having:
a length; and an outside-tip;

wherein the shaft extends outside of the building through said opening, to position the outside-tip outside of the building;

a base, wherein the base is positioned on the solid floor;

a mounting for the shaft containing a disc, wherein the mounting is positioned on the base;

an adjustable-height brace between the base and said solid ceiling portion;

an adjustable brace and clamp positioned between the base and the shaft;

a first electric motor attached to the mounting, wherein the first electric motor changes the length of the shaft;

a subassembly comprising:

a second electric motor;

a third electric motor;

a ring;

a television camera;

a semi-circularly curved coupling having two ends; and a nozzle;

wherein the subassembly is mounted to the outside-tip;

wherein the nozzle is connected to the semi-circularly curved coupling, and the hose is connected to the opposite end of the semi-circularly curved coupling; and wherein the subassembly directs the substance, as it leaves the portable shaft system through the nozzle;

a control console comprising:

a television screen, wherein the television screen shows an image seen by the television camera;

a first individual control for the first electric motor;

a second individual control for the second electric motor; and a third individual control for the third electric motor;

a source of electrical power for the portable shaft system; and an electrical wiring connecting the three electric motors, said disc, said television camera, and said control console;

c) introducing said portable shaft system to the outside of said building through said opening in said wall;

d) using said portable shaft system to direct the substance moving through the hose to control said fire.

UNITED STATES PATENT AND TRADEMARK OFFICE

CERTIFICATE OF CORRECTION

PATENT NO. : 7,984,863 B1
APPLICATION NO. : 12/317612
DATED : July 26, 2011
INVENTOR(S) : Alan E. Berberick It is certified that error appears in the above-identified patent and that said Letters Patent is hereby corrected as shown below:

Column 4, line 65, should read -- shaft mounting (C) using wire (K), as it also is to motor (G). --

Column 5, line 22 - Column 8, line 56, delete claims 1-14 and replace with following claims 1-14:

Claim 1. An overall system comprising:
a building comprising:
a room comprising:
a ceiling, said ceiling having an accessible solid portion;
a hose;
a substance, said substance moving through said hose;
a solid floor; and
a wall, said wall having an opening of at least window-size;
wherein said opening leads to the outside of the building;
wherein the solid ceiling portion and the solid floor are substantially parallel; and
wherein the distance between said solid ceiling portion and said solid floor complies substantially with a national-standard room height; and
said building also comprising a path to said room; and
a portable shaft system comprising:
an extendable shaft, said shaft having:
a length; and
an outside-tip;
wherein the shaft extends outside of the building through said opening, to position the outside-tip outside of the building;

This certificate supersedes all previously issued Certificates of Correction.

Signed and Sealed this
Fifth Day of June, 2012

David J. Kappos
*Director of the United States Patent and Trademark Office* a base, wherein the base is positioned on the solid floor;
a mounting for the shaft containing a disc, wherein the mounting is positioned on the base;
an adjustable-height brace between the base and said accessible solid ceiling portion;
an adjustable brace and clamp positioned between the base and the shaft;
a first electric motor attached to the mounting, wherein the first electric motor changes the length of the shaft;
a subassembly comprising:
a second electric motor;
a third electric motor;
a ring;
a television camera;
a semi-circularly curved coupling having two ends; and
a nozzle;
wherein the subassembly is mounted to the outside-tip of the shaft;
wherein the nozzle is connected to the semi-circularly curved coupling and the hose is connected to the opposite end of the semi-circularly curved coupling; and
wherein the subassembly directs the substance as it leaves the portable shaft system through the nozzle;
a control console comprising:
a television screen, wherein the television screen shows an image seen by the television camera;
a first individual control for the first electric motor;
a second individual control for the second electric motor; and
a third individual control for the third electric motor;
a source of electrical power for the portable shaft system; and
an electrical wiring connecting the three electric motors, said disc, said television camera, and said control console.

Claim 2. The overall system of claim 1 wherein
said base further comprises a series of indentations; and
said adjustable brace and clamp further comprises:
a main section having:
an adjustable length;
a first end; and
a second end;
a clamp positioned at the first end of the main section, wherein the clamp fastens around the shaft; and
a ball positioned at the second end, wherein the ball sits in one of the indentations;
wherein said indentations are closer to the opening in the wall than is the mounting; and
wherein said adjustable brace and clamp fixes an angle between the shaft and the base, as well as an angle between an orthogonal projection of the shaft onto a horizontal plane and the wall of the building.

Claim 3. The overall system of claim 1 wherein the portable shaft system further comprises:

said base having an indentation and a track; and said mounting comprising:

a ball, wherein the ball sits in the indentation;

a triangularly-shaped flange;

a matching triangularly-shaped channel piece;

an area into which the shaft snaps, wherein said disc is adjacent to said shaft; and a place where the first electric motor attaches;

wherein the triangularly-shaped flange remains in the matching triangularly-shaped channel piece;

wherein the matching triangularly-shaped channel piece slides in the track in the base; and wherein the triangularly-shaped flange and the matching triangularly-shaped channel piece prevent rotation of the mounting.

Claim 4. The overall system of claim 1 wherein the portable shaft system further comprises:

said semi-circularly curved coupling is mounted to the outside-tip of the shaft and passes through said ring;

said nozzle is connected to said semi-circularly curved coupling proximate to said ring;

said television camera is mounted on said ring; and said second electric motor and said third electric motor are connected to said ring, to aim said nozzle and said television camera.

Claim 5. The overall system of claim 1 wherein the portable shaft system further comprises said source of electrical power being a battery.

Claim 6. The overall system of claim 5 wherein the portable shaft system further comprises said battery being a rechargeable battery.

Claim 7. The overall system of claim 5 wherein the portable shaft system further comprises said battery being in said control console.

Claim 8. The overall system of claim 6 wherein the portable shaft system further comprises said rechargeable battery being in said control console.

Claim 9. The overall system of claim 1 wherein the portable shaft system further comprises:

said shaft comprising cylindrical, hollow, overlapping sections;

wherein each of said sections has threads, said threads overlapping compatible threads on the adjacent sections; and wherein said first electric motor rotates the particular section of said sections which is adjacent to said mounting, to extend said shaft.

Claim 10. The overall system of claim 9 wherein the portable shaft system further comprises said shaft being retracted by reversing a rotational direction of the first electric motor.

Claim 11. The overall system of claim 10 wherein the portable shaft system further comprises said source of electrical power supplying direct current, wherein reversal of the direct current reverses the rotational direction of the first electric motor.

Claim 12. The overall system of claim 1 wherein
said base further comprises four indentations; and
said adjustable-height brace comprises four legs and a brace;
wherein each of said four legs rests in a respective indentation of said four indentations;
wherein said four legs extend between said four indentations and said accessible solid ceiling portion;
wherein each of said four legs is separately adjustable; and
wherein said brace of said adjustable-height brace is positioned between said four legs.

Claim 13. The overall system of claim 1 further comprising a plurality of rings;
wherein the plurality of rings is attached to a top of said base; and
wherein said hose passes through the plurality of rings attached to the top of said base.

Claim 14. A process for controlling a fire in a building, as well as on and/or near said building, using an overall system which comprises said building and a portable shaft system, said process comprising the steps of:
a) providing a building comprising:
a room comprising:
a ceiling, said ceiling having an accessible solid portion;
a hose;
a substance, said substance moving through said hose;
a solid floor; and
a wall, said wall having an opening of at least window-size;
wherein said opening leads to the outside of the building;
wherein the solid ceiling portion and the solid floor are substantially parallel; and
wherein the distance between said solid ceiling portion and said solid floor complies substantially with a national-standard room height;
said room being safe for a team of operators; and
said building also comprising a path to said room, wherein said path is also safe for the team of operators;
b) providing a portable shaft system, and assembling said portable shaft system prior to the path to said room, along the path to said room, and in said room, said portable shaft system comprising:

an extendable shaft, said shaft having:
a length; and
an outside-tip;
wherein the shaft extends outside of the building through said opening, to position the outside-tip outside of the building;
a base, wherein the base is positioned on the solid floor;
a mounting for the shaft containing a disc, wherein the mounting is positioned on the base;
an adjustable-height brace between the base and said accessible solid ceiling portion;
an adjustable brace and clamp positioned between the base and the shaft;
a first electric motor attached to the mounting, wherein the first electric motor changes the length of the shaft;
a subassembly comprising:
a second electric motor;
a third electric motor;
a ring;
a television camera;
a semi-circularly curved coupling having two ends; and
a nozzle;
wherein the subassembly is mounted to the outside-tip of the shaft;
wherein the nozzle is connected to the semi-circularly curved coupling and the hose is connected to the opposite end of the semi-circularly curved coupling; and
wherein the subassembly directs the substance as it leaves the portable shaft system through the nozzle;
a control console comprising:
a television screen, wherein the television screen shows an image seen by the television camera;
a first individual control for the first electric motor;
a second individual control for the second electric motor; and
a third individual control for the third electric motor;
a source of electrical power for the portable shaft system; and
an electrical wiring connecting the three electric motors, said disc, said television camera, and said control console;
c) introducing said portable shaft system to the outside of said building through said opening in said wall;
d) using said portable shaft system to direct the substance moving through the hose to control said fire.